United States Patent [19]

Fisher et al.

[11] Patent Number: 5,606,466
[45] Date of Patent: Feb. 25, 1997

[54] METHOD FOR OVERLAPPING BLOCK READ EVENTS IN DISK DRIVE

[75] Inventors: Kevin D. Fisher, Palo Alto, Calif.; Bruce Buch, Westboro, Mass.; Thomas Lau, Sunnyvale; Pablo A. Ziperovich, Palo Alto, both of Calif.

[73] Assignee: Quantum Corporation, Milpitas, Calif.

[21] Appl. No.: 546,628

[22] Filed: Oct. 23, 1995

[51] Int. Cl.$^6$ ............................ G11B 5/09; H04N 5/76
[52] U.S. Cl. ............................ 360/51; 360/46; 360/67; 360/65; 369/59
[58] Field of Search .................. 360/51, 48, 46, 360/65, 67; 369/59

[56] References Cited

U.S. PATENT DOCUMENTS

| 4,775,899 | 10/1988 | Pasdera et al. | 358/339 |
| 5,327,300 | 7/1994 | Satomura | 360/51 |
| 5,341,249 | 8/1994 | Abbott et al. | 360/46 |

OTHER PUBLICATIONS

"Design and Performance of a VLSI 12 MB/s Trellis –Coded Partial Response Channel", Christiansen et al., Aug., 1994.

Primary Examiner—W. C. Kim
Attorney, Agent, or Firm—David B. Harrison; Debra A. Chun

[57] ABSTRACT

A new method for overlapping block read events in a disk drive having synchronously sampled data detection channels is presented. In particular, the new method is for overlapping read back processing by real-time and digital signal processing of first and second data blocks from a storage medium. The method includes steps of clocking real-time and digital signal processes by a clock synchronized to the first data block while the first data block is passing by a data transducer head, clocking the digital signal processes for the first data block by an asynchronous clock operating at a nominal data clocking rate after the first data block has passed by the data transducer head and before a clock has synchronized to the second data block following the first data block, and clocking real-time signal processes for the second data block and completing clocking of the digital processes for the first data block by a clock synchronized to the second data block passing by the data transducer head. The storage medium can be a magnetic hard disk, magnetic tape, or an optical disk, for example.

15 Claims, 3 Drawing Sheets

METHOD FOR OVERLAPPING BLOCK READ EVENTS IN DISK DRIVE

FIELD OF THE INVENTION

The present invention relates to data storage devices known as disk drives. More particularly, the present invention relates to a method for overlapping block read events in disk drives, particularly those having synchronously sampled data detection channels, such as partial response, maximum likelihood read data channels.

BACKGROUND OF THE INVENTION

Disk drives typically arrange data as blocks or sectors within concentric data tracks defined on a storage surface of a rotating medium. In magnetic disk drives, the storage surface includes a magnetic material which serves as the storage medium. In Winchester or flying-head disk drives, known as hard disk drives, a magnetic read-write element or elements is carried upon a slider which flies in very close proximity to the data storage surface upon an air bearing. Data is written to sectors by the write element, and data is read from the sectors by the read element.

As disk drive storage capacities have continued to escalate upwardly, new and more advanced techniques have been employed to effectively increase the amount of data per unit areal density of the storage medium. One technique has been to employ a synchronously sampled data detection channel in place of an older peak detection channel. In a peak detection channel magnetic flux transitions must be spaced sufficiently apart to avoid pulse crowding. Pulse crowding lead to two drawbacks for peak detection channels. The first is that the amplitudes of the pulses are altered. The second is that the positioning of the peaks of the pulses are shifted, leading to peak shift, a form of intersymbol interference. The synchronously sampled data detection channel is more powerful than peak detection techniques in that coded information bits, represented as flux transitions, may be placed more closely together and still resolved as information than was possible with peak detection techniques. One example of a synchronously sampled data detection channel is provided by commonly assigned U.S. Pat. No. 5,341,249 to Abbott et al., entitled: "Disk Drive Using PRML Class IV Sampling Data Detection with Digital Adaptive Equalization", the disclosure thereof being incorporated herein by reference.

As the magnetic disk drive read channel detection schemes have become more powerful, the amount of digital processing of the channel output has increased. This increase in digital processing has resulted in increased read latency in the detector. For a hard disk drive with a relatively small sector size (generally 512 user bytes, but sometimes 256 user bytes or less) and possibly including ID fields and split sectors, the larger read latency is increasing the amount of wasted disk space ("pad") which is required between sectors. Unless special measures are taken, it is necessary to finish processing of a previous sector before beginning processing of a next sector. This problem is exemplified in the uppermost graph of FIG. 1 which illustrates (in a linearized depiction) two disk sectors S1 and S2. Two pad fields separate sectors S1 and S2. The first pad field P1 is a digital process latency pad field (which is wasted disk storage space required to enable digital processes to complete the processing of the S1 information before beginning processing of the S2 information). The second pad field STB represents a small spindle speed tolerance buffer pad which is required to accommodate disk rotational tolerances within the disk drive and from drive to drive within a product family.

As an example, a synchronously sampled data detection channel will typically include a Viterbi decoder including a memory path, and a channel decoder. In addition, an interface to a disk sequencer or controller will include a parallel-to-serial conversion process. As more complex partial-response polynomials and advanced coded channel schemes with long block lengths become common (such as trellis coded partial-response), significant increases in Viterbi decoding and channel decoding may result. Typical delays for Viterbi decoding and channel decoding are 10–50 bits and 8–40 bits, respectively.

With contemporary PRML read channels, a decoding delay of six to ten bytes is typical and will likely increase as detectors become more complex. Depending on the overall drive architecture (e.g. split sectors and/or ID fields), this delay can increase disk overhead by as much as two to four percent (2–4%) of a sector. Thus, in the example given in FIG. 1 the pad field P1 would have a length of six to ten bytes in order to accommodate digital processing latency. The read gate line RD GATE will be enabled at the beginning of S1 and S2, and there will be some process latency before the channel begins to put out digital data from the digital processes including the Viterbi detector and channel decoder, etc. This delay is marked on the second graph of FIG. 1 as SD (for start data). Digital data continues flowing out of the channel pipeline until all of the user data read from sector S1 has been processed and flushed out, as marked by the falling edge of RD GATE (also identified as ED for end of data). RD GATE remains unasserted throughout the speed tolerance buffer STB and rises to an asserted level at the beginning of the second sector S2. The third graph illustrates a time window when channel data is valid and this time window co-extends with the interval between start data SD and end of data ED in the second graph of FIG. 1. The hatched region of the read data valid graph represents the digital process latency interval after the analog channel has completed delivering the information recorded in sector S1 and is coextensive in time with the length of the pad field P1.

In the field of magnetic recording employing multiple heads for scanning a magnetic recording medium in helical fashion to remove data block skew between heads. One example of this prior art is provided by U.S. Pat. No. 4,775,899 to Pasdera et al., entitled: "Apparatus for Deskewing Successively Occurring Blocks of Data". Nevertheless, it has been recognized by technologists in the field that at least one drawback for trellis-coded partial response channels has been the relatively long digital processes had negative implications for throughput rate, decoding delays and track format overhead, see Christiansen, Fredrickson, Karabed, Rae, Shih, Siegel and Thapar, "Design and Performance of a VLSI 12 MB/s Trellis-Coded Partial Response Channel", *The Magnetic Recording Conference*, San Diego, Calif., Aug. 15–17, 1994, paper F-6.

Accordingly, a hitherto unsolved need remains for a practical method for overlapping block read events in a disk drive in a manner overcoming limitations and drawbacks of the prior art.

SUMMARY OF THE INVENTION

A general object of the present invention is to provide a method for overlapping block read events in a data storage apparatus, such as a magnetic hard disk drive in a manner overcoming limitations and drawbacks of the prior art.

In one aspect of the present invention, data is written to and read back from a relatively moving data storage medium within a data storage and retrieval channel such as a magnetic rotating hard disk drive. The data is read back as data blocks from the data storage medium in real time as the storage medium moves past a data transducer head. The data blocks are written asynchronously with respect to each other at a nominal data clocking rate and with inter-block gaps between adjacent data blocks. A first data block read from the data storage medium is processed by first data signal processes synchronized to the first data block. The first block is subsequently processed by second digital signal processes. The new method for overlapping read back of the first and second data block comprises the steps of:

clocking the second digital signal processes by a clock synchronized to the first data block while the first data block is passing by the data transducer head, clocking the second digital signal processes for the first data block by an asynchronous clock operating at the nominal data clocking rate after the first data block has passed by the data transducer head and before a clock has synchronized to a second data block following the first data block, and clocking the first data signal processes for the second data block and completing clocking of the second digital processes for the first data block by a clock synchronized to the second data block passing by the data transducer head. In this aspect of the present invention, the relatively moving data storage medium may be a magnetic hard disk, magnetic tape, or an optical disk.

In one related aspect of the present invention processing of the real-time data signal processes is synchronized via a digital phase locked loop phase locked to the data being read back respectively from the first and second data blocks, and the step of clocking the second digital signal processes is carried out by generating the asynchronous clock at the nominal data clock rate by a frequency synthesizer controlled by reference to disk radius at which the first and second data blocks are written. In this aspect of the invention the first and second data blocks may be written in a concentric data track within a zone of a multiplicity of concentric tracks, there being a plurality of zones defined across the rotating magnetic disk, the nominal data clock rate being established for each zone.

In another related aspect of the present invention a first one of the real-time data signal processes comprises the step of synchronously sampling the data within the first and second data blocks; a second one of the real-time data signal processes comprises the step of equalizing the data to a predetermined spectrum by equalizing an analog signal stream read back by the data transducer head to the predetermined spectrum before performing the synchronous sampling step and/or equalizing the synchronous samples obtained by the synchronous sampling step; a third one of the real-time data signal processes comprises the step of normalizing gain of an analog signal stream read back by the data transducer head; and, a fourth one of the real-time data signal processes comprises the step of normalizing DC offset of an analog signal stream read back by the data transducer head.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF PREFERRED EMBODIMENTS

Figure 2:
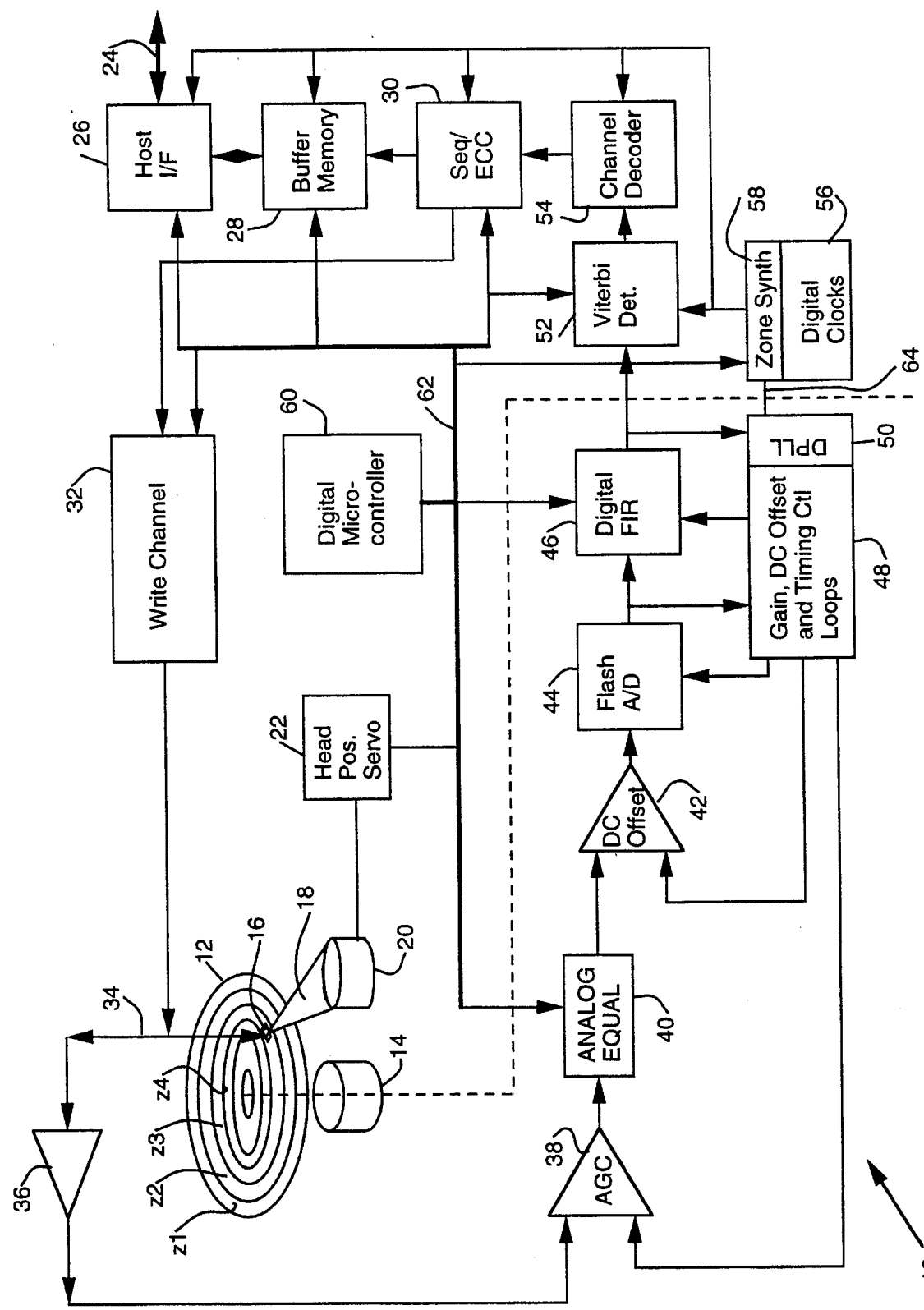
FIG. 2 is a block diagram of a magnetic hard disk drive employing a method for overlapping sector read events within a synchronously sampled data detection process in accordance with principles of the present invention.

A magnetic hard disk drive 10 operating in accordance with principles of the present invention includes a rotating data storage disk 12 having a storage surface defining a plurality of rings or zones of concentric tracks. Four zones Z1, Z2, Z3 and Z4 are shown extending from an outside diameter to an inside diameter. Each zone has a nominal data transfer rate adapted to zone inner disk radius at which relative velocity between a head 16 and the disk is lowest. While four zones are illustrated in the FIG. 2 example a fewer or greater number of zones may be provided. Each zone includes a multiplicity of concentric data storage tracks which are divided up into segments or "sectors". Each sector may include certain overhead information which is used to control operations of the disk drive 10 and to provide data integrity via conventional error correction code processes, etc.

The disk 12 is rotated at a desired angular velocity by a disk spindle motor 14. The positionable data head 16 comprises an air bearing slider for carrying a magnetic read and write transducer structure. The slider enables the head 16 to operate in flying relationship just above or in near or pseudo-contact with the disk surface. A flying height of 1–2 micro inches is feasible with contemporary head/disk technology. The head transducer may be e.g. a metal-in-gap or thin film read/write element, or it may be an inductive thin film write element and a separate magneto-resistive read element as is conventionally known and used in magnetic recording technology. The head 16 is mounted via a head-gimbal assembly to a head arm 18 which is in turn positioned by e.g. a rotary voice coil actuator motor 20. A head position servo loop 22 responsive to head position servo information embedded all or some of the data sectors enables the head 16 to be positioned precisely relative to a desired concentric track location.

An interface bus 24 enables the disk drive 10 to be connected functionally to a host computing system via a suitable interface structure/convention. An interface circuit 26 electrically interconnects the drive 10 with the interface bus 24. A buffer memory array 28 enables blocks of user data in transit between the disk 12 and a host computer to be temporarily stored. A sequencer 30 enables the blocks of data to be sequenced between the disk 12 and the buffer memory 28. A write channel 32 is connected to the sequencer during data writing to disk operations and encodes and prepares the digital data to be written to a selected data location on the disk 12 within one of the zones Z1–Z4.

After the data has been written to the disk 12, it is available to be read back by the head 16. Electrical analog signals picked up by the head 16 are carried by a connector path 34 to a preamplifier 36 located near the head. The preamplifier amplifies the minute electrical analog signals read back from the disk and delivers the signals to an automatic gain control (AGC) function 38. A programmable analog equalizer stage 40 equalizes the analog signal in accordance with a desired filter function, adjusted in relation to the particular data zone Z1–Z4 from which the data has been read. A DC offset function removes DC offset components from the analog read signal before a flash analog-to-digital converter quantizes the analog read signal into a sequence of synchronous digital signal samples. A digital finite impulse response filter 46 applies further spectral equalization to the digital samples. Control loops for gain, DC offset and timing are shown within the block 48. Each loop processes the digital signal samples and generates a feedback control which is provided respectively to the AGC function 38, DC Offset function 42, and flash A/D 44. The timing loop includes a digital phase locked loop (DPLL) 50 which is discussed hereinbelow in connection with more details of the present invention.

A dashed line passing through the spindle motor 14 separates the AGC function 38, analog equalizer 40, DC offset function 42, flash A/D 44, digital FIR 46 and control loops 48-50 from the remainder of the drive electronics. This dashed line denotes that the foregoing processes are coupled to and are controlled by disk rotation. On the other hand, subsequent digital processes within the read channel including e.g. a Viterbi detector 52 (including a memory path) and a channel decoder 54 (as well as the sequencer 30 with its ECC process, buffer memory 28 and host interface 26) are not coupled to disk rotation, and may be clocked without lock-step synchronism with the disk 12. A digital microcontroller 60 embedded within the drive 10 controls disk drive operations via an internal control and data bus structure 62 in conventional fashion. Accordingly, the digital microcontroller 60 controls the head position servo loop 22 to position the head 16 at a selected track within one of the zones Z1–Z4, controls the zone synthesizer 58 to generate a clock at a rate tailored to the selected zone, and controls filter characteristics e.g. of the analog equalizer 40 and the digital FIR 46 to match the selected zone.

Also included outside of the dashed line are digital clocks 56 including a zone synthesizer 58 which generates a clocking rate appropriate for each zone Z1–Z4 of the disk surface. The synthesizer 58 thus provides a clocking signal to control the write channel 32 during data writing operations. In accordance with aspects of the present invention, the synthesizer 58 also provides clocking signals to digital processes of the read channel which are not coupled to the disk 12 during portions of data read back of each data sector. A clock path 64 across the dashed line between the DPLL 50 and the zone synthesizer 58 denotes that there are two sources of digital clocking signals during each block read event of the disk drive 10.

Figure 3:
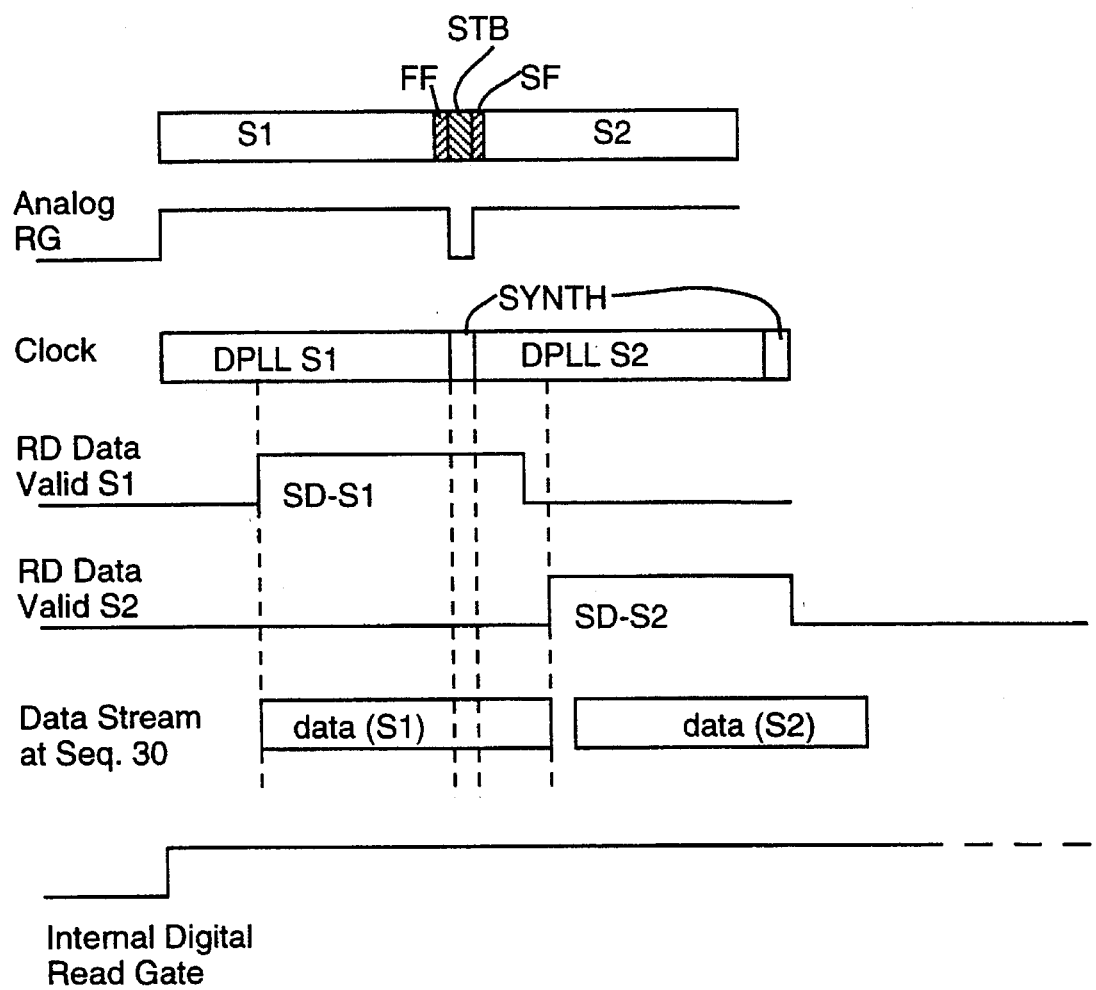
FIG. 3 is a series of time-aligned graphs illustrating a method for overlapping sector read events within a synchronously sampled data detection process in accordance with principles of the present invention.

Turning now to FIG. 3, in accordance with advantages of the present invention, in the upper graph sectors S1 and S2 are shown adjacently recorded within a track on the disk 12 such as to avoid the pad fields P1 ... Pn, thereby saving disk space. Each sector ends with a brief flush field FF for flushing out the digital read process pipeline with known values, and each sector begins with an analog setup field SF to enable setup of the analog processes. The speed tolerance buffer STB remains in place as needed in a practical disk drive implementation. The second graph in FIG. 3 illustrates assertion of an analog read gate control signal throughout the duration of each data sector (and excluding the speed tolerance buffer interval). A third graph of FIG. 3 illustrates the clocking signal which is applied to clock the uncoupled digital processes including the Viterbi detector 52 and channel decoder 54 during each sector read. During the read of the S1 block, the DPLL 50 is locked to data in order to provide a synchronous clock to the flash A/D 44. This DPLL clock is applied to clock the Viterbi detector 52 and the channel decoder 54. From the fourth graph of FIG. 3 it is apparent that because of digital process latencies, data does not start arriving at the sequencer/ECC block 30 until some time after reading the S1 block has begun, as denoted by a rising edge of a virtual signal "read data valid for block S1". The processed data stream from block S1 continues well past the end point of the S1 sector, through the speed tolerance buffer and into the next sector S2.

Figure 1:
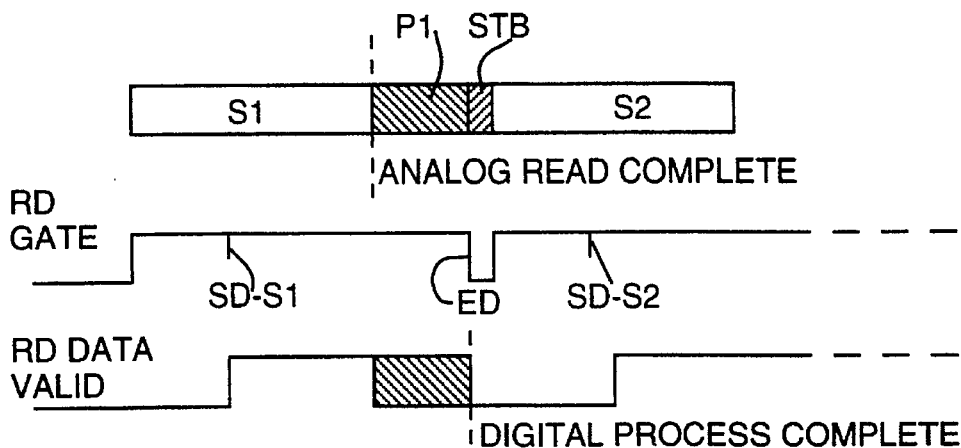
FIG. 1 is a series of time-aligned graphs illustrating a digital process overhead pad added to an end of a data storage sector in order to accommodate digital processing latencies associated with synchronously sampled data detection processes within a disk drive in accordance with the prior art.

In order to avoid the pad field P1 ... Pn previously required as shown in FIG. 1, it is necessary to continue to clock the uncoupled processes 52 and 54 after the end of each sector is reached. Since the uncoupled processes 52 and 54 are not necessarily in synchronism with the storage disk 12, the digital clock synthesizer 58 is called into service to clock these processes during the speed tolerance buffer interval and up until the point of zero phase restart of the digital timing loop for the next sector S2. At that point, even though the uncoupled processes for processing the read block for S1 have not yet completed, the DPLL 50, synchronized to the S2 sector information, becomes the clocking source for clocking the uncoupled pipeline processes which are finishing up processing of the S1 data block. This is because the DPLL 50 has to be locked to the data of the S2 sector in order to provide properly synchronized sampling thereof (which is going on at a head end of the digital process pipeline at the same time that the S1 block is being completed at a discharge end of the digital process pipeline).

In order for overlapping read events to function properly, an appropriate clocking scheme must be imposed upon the read channel. During normal operations the read channel clock is extracted from the incoming read signal by the DPLL 50. After a read signal is no longer present at the read channel input, and while the uncoupled bit-detector pipeline is still being flushed, the reference frequency for the particular zone as generated by the zone synthesizer 58 is used as the clocking source. When locking to the preamble of a subsequent sector (e.g. S2), the bit-detector clock is then slaved to the acquired DPLL clock which is extracted from the subsequent sector. This clocking arrangement precludes any pipeline overflows which might occur if two different clocking frequencies were used.

Figure 4:
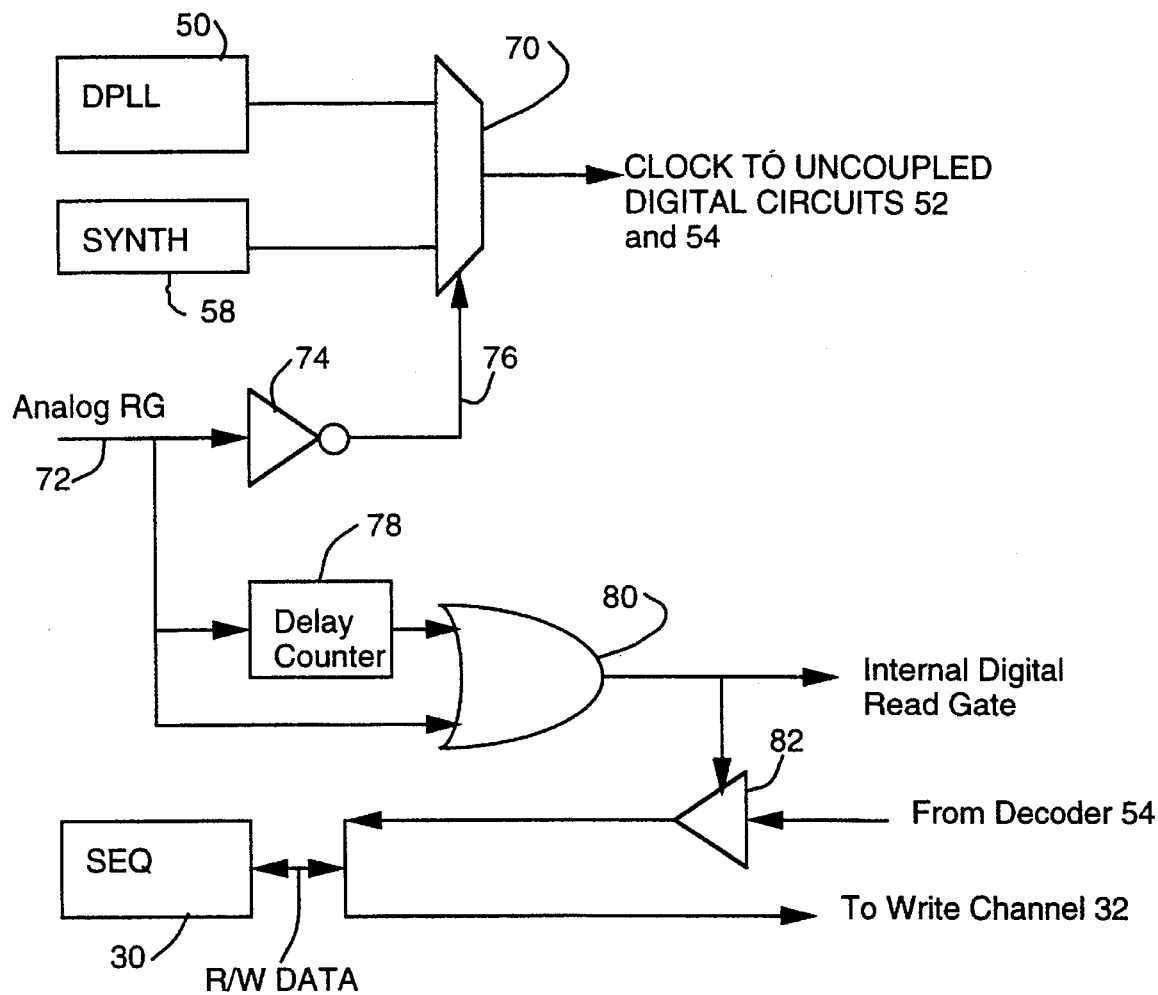
FIG. 4 is a simplified logic block diagram of logic for generating clocking and control signals for implementing the FIG. 3 method.

FIG. 4 depicts a simplified logic block diagram for implementing a method for overlapping block read events in accordance with the present invention. The DPLL 50 and the zone synthesizer 58 provide outputs to a "glitchless" selector or multiplexer 70 which selects and puts out a digital clock signal to clock the uncoupled read channel processes such as the Viterbi detector 52 and the channel decoder 54 without generating clocking artifacts at any frequency above the nominal selected zone clock frequency. An analog read gate control signal 72 (graphed as the second graph of FIG. 3) is inverted by an inverter 74 and used to control glitchless multiplexer 70 via a control line 76. When the analog read gate control signal is true, the clocking signal is taken from the DPLL 50. When the analog read gate control signal becomes false (during the speed tolerance buffer interval, for example), the clocking signal is taken from the digital zone synthesizer 58.

The analog read gate control signal 72 also passes through a delay function 78 having a delay which matches the latency of the digital signal processes as shown in the sixth graph of FIG. 3 relative to the first graph of FIG. 3. The analog read gate control signal 72 is ORed with the delayed analog read gate control signal put out from the delay function 78 to provide the internal digital data read gate signal, graphed as the bottom graph of FIG. 3. Ideally, the circuitry of FIG. 4 is included within VLSI circuitry including the digital read channel components. Thus, the FIG. 4 logic implements an overlapping read event interface by reinterpreting the analog read gate signal provided by the sequencer 30.

In previous interfaces, the rising edge of read gate turned on the read channel, triggered a zero phase start and started a preamble acquisition process by which the gain, DC offset and timing loops became synchronized to data from disk. The read channel then stayed in an idle mode until the next read request (or servo data interrupt). With the new overlapping read event interface of the present invention, a rising edge of the analog read gate will still trigger a zero phase start and will begin preamble acquisition. However, at the end of the sector, the read channel will now have an internal delay counter 78 which shifts the effective falling edge of read gate to a time after which the Viterbi detector, decoder and sequencer interface have completed their uncoupled digital processes.

Thus, the uncoupled processes of the read channel will continue to output data even after analog read gate has fallen. The delay of the delay counter 78 is related to the latency of the bit detector. The sequencer 30 includes a similar data counter and continues to accept data from the read channel until its data counter has reached a count corresponding to data block length. During this period of time when the bit-detector pipeline is being flushed, the start of another read event may be triggered by reasserting analog read gate. The read channel DPLL can then simultaneously lock to the next sector while providing a clock for completing processing of the previous sector.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. In a data storage and retrieval channel in which data is written to and read from a relatively moving data storage medium, the data being read back as data blocks from the data storage medium in real time as the storage medium moves past a data transducer head, the data blocks being written asynchronously with respect to each other at a nominal data clocking rate and with inter-block gaps between adjacent data blocks, a first data block read from the data storage medium being processed by first data signal processes synchronized to the first data block, and the first block being subsequently processed by second digital signal processes, a method for overlapping first and second data block read events comprising the steps of:

clocking the second digital signal processes by a clock synchronized to the first data block while the first data block is passing by the data transducer head, clocking the second digital signal processes for the first data block by an asynchronous clock operating at the nominal data clocking rate after the first data block has passed by the data transducer head and before a clock has synchronized to a second data block following the first data block, and clocking the first data signal processes for the second data block and completing clocking of the second digital signal processes for the first data block by a clock synchronized to the second data block passing by the data transducer head.

2. In the data storage and retrieval channel set forth in claim 1 wherein the relatively moving data storage medium comprises a magnetic hard disk.

3. In the data storage and retrieval channel set forth in claim 1 wherein the relatively moving data storage medium comprises a magnetic tape.

4. In the data storage and retrieval channel set forth in claim 1 wherein the relatively moving data storage medium comprises an optical disk.

5. In a rotating magnetic disk drive in which data is written to and read from a rotating magnetic data storage disk, the data being read back as data blocks from the rotating magnetic disk in real time as it moves past a data transducer head, the data blocks being written asynchronously with respect to each other at a nominal data clocking rate established with reference to disk diameter and with inter-block gaps between adjacent data blocks, a first data block read from the rotating magnetic disk being processed by real-time data signal processes synchronized to the first data block, and the first block being subsequently processed by subsequent digital signal processes carried out within the disk drive, a method for overlapping first and second data block read events comprising the steps of:

clocking the subsequent digital signal processes by a clock synchronized to the first data block while the first data block is passing by the data transducer head, clocking the subsequent digital signal processes for the first data block by an asynchronous clock operating at the nominal data clocking rate after the first data block has passed by the data transducer head and before a clock has synchronized to a second data block following the first data block, and clocking the real-time data signal processes for the second data block and completing clocking of the subsequent digital signal processes for the first data block by a clock synchronized to the second data block passing by the data transducer head.

6. The method set forth in claim 5 wherein processing of the real-time data signal processes is synchronized via a digital phase locked loop phase locked to the data being read back respectively from the first and second data blocks.

7. The method set forth in claim 5 wherein the step of clocking the subsequent digital signal processes is carried out by generating the asynchronous clock at the nominal data clock rate by a frequency synthesizer controlled by reference to disk radius at which the first and second data blocks are written.

8. The method set forth in claim 7 wherein the first and second data blocks are written in a concentric data track within a zone of a multiplicity of concentric tracks, there being a plurality of zones defined across the rotating magnetic disk, the nominal data clock rate being established for each said zone.

9. The method set forth in claim 5 wherein a first one of the real-time data signal processes comprises the step of synchronously sampling the data within the first and second data blocks.

10. The method set forth in claim 9 wherein second one of the real-time data signal processes comprises the step of equalizing the data to a predetermined spectrum.

11. The method set forth in claim 10 wherein the step of equalizing the data to a predetermined spectrum comprises the step of equalizing an analog signal stream read back by the data transducer head to the predetermined spectrum before performing the synchronous sampling step.

12. The method set forth in claim 10 wherein the step of equalizing the data to a predetermined spectrum comprises the step of equalizing synchronous samples obtained by the synchronous sampling step.

13. The method set forth in claim 10 wherein the step of equalizing the data to a predetermined spectrum comprises the steps of:

equalizing an analog signal stream read back by the data transducer head to the predetermined spectrum before performing the synchronous sampling step, and equalizing synchronous samples obtained by the synchronous sampling step.

14. The method set forth in claim 5 wherein one of the real-time data signal processes comprises the step of normalizing gain of an analog signal stream read back by the data transducer head.

15. The method set forth in claim 5 wherein one of the real-time data signal processes comprises the step of normalizing DC offset of an analog signal stream read back by the data transducer head.

* * * * *